United States Patent
Jain et al.

(10) Patent No.: US 9,652,288 B2
(45) Date of Patent: May 16, 2017

(54) ALLOCATION OF COMPUTATIONAL RESOURCES WITH POLICY SELECTION

(75) Inventors: Navendu Jain, Bellevue, WA (US); Ishai Menache, Redmond, WA (US); Ohad Shamir, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1177 days.

(21) Appl. No.: 13/421,959

(22) Filed: Mar. 16, 2012

(65) Prior Publication Data

US 2013/0246208 A1 Sep. 19, 2013

(51) Int. Cl.
  *G06Q 30/00* (2012.01)
  *G06F 9/50* (2006.01)

(52) U.S. Cl.
  CPC .......... *G06F 9/50* (2013.01); *G06F 2209/501* (2013.01)

(58) Field of Classification Search
  CPC ................................. G06Q 30/08; G06F 9/50
  USPC ...................................................... 705/26, 27
  See application file for complete search history.

(56) References Cited

U.S. PATENT DOCUMENTS

| | | | | |
|---|---|---|---|---|
| 8,555,287 B2 * | 10/2013 | Ding | | G06F 9/505 |
| | | | | 718/102 |
| 8,612,330 B1 * | 12/2013 | Certain et al. | | 705/37 |
| 2005/0131773 A1 * | 6/2005 | Daur | | G06Q 10/06 |
| | | | | 705/27.1 |
| 2008/0059972 A1 * | 3/2008 | Ding et al. | | 718/105 |
| 2008/0243629 A1 * | 10/2008 | Chang | | G06Q 10/06 |
| | | | | 705/26.5 |
| 2011/0145657 A1 | 6/2011 | Bishop et al. | | |
| 2012/0284721 A1 * | 11/2012 | Antani et al. | | 718/101 |

OTHER PUBLICATIONS

Dutreilh, et al., "Using Reinforcement Learning for Autonomic Resource Allocation in Clouds: Towards a Fully Automated Workflow", In Proceedings of the Seventh International Conference on Autonomic and Autonomous Systems, May 27, 2011, pp. 67-74.

Iqbal, et al., "Adaptive Resource Allocation for Back-end Mashup Applications on a Heterogeneous Private Cloud", In Proceedings of Electrical Engineering/Electronics Computer Telecommunications and Information Technology, May 21, 2010, pp. 317-321.

(Continued)

*Primary Examiner* — Rob Pond
(74) *Attorney, Agent, or Firm* — International IP Law Group, PLLC (57) ABSTRACT

A method for adaptively allocating resources to a plurality of jobs. The method comprises selecting a first policy from a plurality of policies for a first job in the plurality of jobs by using a policy selection mechanism, allocating at least one resource to the first job in accordance with the first policy, and in response to completion of the first job, updating the policy selection mechanism to obtain an updated policy selection mechanism by using at least one processor. Updating the policy selection mechanism comprises evaluating the performance of the first policy with respect to the first job by calculating a value of a metric of utility for the first policy based on conditions associated with execution of the first job and updating the policy selection mechanism based on the calculated value and a delay of execution of the first job.

20 Claims, 6 Drawing Sheets

(56) References Cited

OTHER PUBLICATIONS

Teng, et al., "Resource Pricing and Equilibrium Allocation Policy in Cloud Computing", In Proceedings of the 10th IEEE International Conference on Computer and Information Technology, Sep. 16, 2010, pp. 195-202.
Rao, et al., "VCONF: A Reinforcement Learning Approach to Virtual Machines Auto-configuration", In Proceedings of the 6th International Conference on Autonomic Computing & Communications, Jun. 15-19, 2009, pp. 137-146.
Dutreilh, et al., "From Data Center Resource Allocation to Control Theory and Back", In Proceedings of the 3rd International Conference on Cloud Computing, Aug. 26, 2010, pp. 410-417.
Rahman, et al., "Risk Aware Resource Allocation for Clouds", Published on: Jul. 11, 2011, Available at: https://www.ideals.illinois.edu/bitstream/handle/2142/25754/paper.pdf?sequence=3.
Iqbal, et al., "Policy Learning for Adaptive Allocation of Cloud Resources to Multi-tier Web Applications", Retrieved on: Oct. 11, 2011, pp. 2.
Amazon Elastic Compute Cloud (Amazon EC2) http://aws.amazon.com/ec2/, pp. 1-11, Oct. 11, 2011.
Focus on your Application http://www.microsoft.com/windowsazure, 1 page, Oct. 11, 2011.
Google App Engine—Google Code http://code.google.com/appengine/, 3 pages, Oct. 11, 2011.
IBM Smart Cloud http://www.ibm.com/cloud-computing/us/en/, 13 pages, 2011.
Amazon EC2 Spot Instances http://aws.amazon.com/ec2/spot-instances/, 9 pages, Oct. 11, 2011.
M. Alizadeh, A. Greenberg, D. Maltz, J. Padhye, P. Patel, B. Prabhakar, S. Sengupta, and M. Sridharan, "Data Center TCP (DCTCP)," in SIGCOMM, 2010.
Litmus http://litmus.com/, 3 pages, date unknown.
BrowserMob Provides Free Website Monitoring and Load Testing https://browsermob.com/performance-testing, 3 pages, Oct. 11, 2011.
N. Cesa-Bianchi and G. Lugosi, Prediction, learning, and games. Cambridge University Press, 2006.
Jain et al. On-demand or Spot? Learning-based Resource Allocation for Delay-tolerant Batch Computing http://research.microsoft.com/en-us/um/people/navendu/papers/LBR_infocom.pdf, 10 pages, date unknown.
C. McDiarmid, "On the method of bounded differences," in Surveys in Combinatorics, ser. London Mathematical Society Lecture Note Series, J. Siemons, Ed. Cambridge University Press, 1989, vol. 141, pp. 148-188.
Y. Freund and R. E. Schapire, "A decision-theoretic generalization of on-line learning and an application to boosting," J. Comput. Syst. Sci., vol. 55, No. 1, pp. 119-139, 1997.
R. Gramacy, M. Warmuth, S. Brandt, and I. Ari, "Adaptive caching by refetching," in NIPS, 2002.
I. Ari, A. Amer, R. Gramacy, E. Miller, S. Brandt, and D. Long, "Acme: Adaptive caching using multiple experts," in WDAS, 2002.
D. Helmbold, D. Long, T. Sconyers, and B. Sherrod, "Adaptive disk spin-down for mobile computers," MONET, vol. 5, No. 4, pp. 285-297, 2000.
B. Kveton, J. Y. Yu, G. Theocharous, and S. Mannor, "Online learning with expert advice and finite-horizon constraints," in AAAI, 2008.
A. Blum and C. Burch, "On-line learning and the metrical task system problem," Machine Learning, vol. 39, No. 1, pp. 35-58, 2000.
C. Mesterham, "Online learning with delayed label feedback," in ALT, 2005.
J. Langford, A. J. Smola, and M. Zinkevich, "Slow learners are fast," in NIPS, 2009.
O. S. O. Dekel, R. Gilad-Bachrach and L. Xiao, "Optimal distributed online prediction," in ICML, 2011.
D. P. Helmbold, D. D. E. Long, and B. Sherrod, "A Dynamic Disk Spin-Down Technique for Mobile Computing," MOBICOM 1996, pp. 130-142.
On-demand or Spot? Learning-based Resource Allocation for Delay-tolerant Batch Computing http://research.microsoft.com/en-us/um/people/navendu/papers/LBR_infocom.pdf, 11 pages, 2012.

\* cited by examiner

Parameters (Fixed-Bid Policies): On-demand rate $\sigma \in [0,1]$; bid $b \in \mathbb{R}_+$.
Parameters (Variable-Bid Policies): On-demand rate $\sigma \in [0,1]$; weight $\gamma \in [0,1]$; safety parameter $\epsilon \in \mathbb{R}_+$.
Input: Job parameters $\{d_j, z_j, c_j, v_j\}$
If $c_j * d_j < z_j$ or $p * \sigma * z_j > v_j$, drop job //Job too large or expensive to handle profitably
for Time slot $t$ in which the job is active do
  If job is done, return
  Let $m$ be the number of remaining time slots till job deadline (including the current one)
  Let $r$ be the remaining job size
  Let $q$ be the cost incurred so far in treating the job
  // Check if more on-demand instances needed to ensure timely job completion
  if $(\sigma + m - 1)\min\{r, c_j\} < r$ then
    // Check if running job just with on-demand is still worthwhile
    if $p * m + q < v_j$ then
      Request $\min\{r, c_j\}$ on-demand instances
    else
      Drop job
    end if
  else
    Request $\sigma * \min\{r, c_j\}$ on-demand instances
    Request $(1 - \sigma) * \min\{r, c_j\}$ spot instances at price:
        Fixed-Bid Policy: Bid Price $b$
        Variable-Bid Policy: $\frac{1}{Z}\int_y p_*(y)\gamma^{\tau-y}dy + \epsilon$,
        where $Z = \int_y \gamma^{\tau-y}dy$ is normalization constant
  end if
end for

FIG. 4A

Input: Set of $n$ policies $\pi$ parameterized by $\{1,\ldots,n\}$, upper bound $d$ on jobs' lifetime
Initialize $\mathbf{w}_1 = (1/n, 1, n, \ldots, 1/n)$ for $j = 1, \ldots, J$ do            402
    Receive job $j$
    Pick policy $\pi$ with probability $w_{j,\pi}$, and apply to job $j$
    if $j \leq d$ then
        $\mathbf{w}_{j+1} := \mathbf{w}_j$
    else
        $\eta_j := \sqrt{2\log(n)/d(j-d)}$
        for $i = 1, \ldots, n$ do
            Compute $f_j(\pi)$ to be the utility for job $j - d$, assuming we used policy $\pi$
            $w_{j+1,\pi} := w_{j,\pi} \exp(\eta_j f_j(\pi))$      404
        end for
        for $\pi = 1, \ldots, n$ do
            $w_{j+1,\pi} := w_{j+1,\pi} / \sum_{\pi=1}^{n} w_{j+1,\pi}$      406
        end for
    end if
end for

ALLOCATION OF COMPUTATIONAL RESOURCES WITH POLICY SELECTION

BACKGROUND

Cloud computing platforms allow users to execute computing tasks, sometimes called "jobs," without owning the computing resources used to execute the computing tasks. A cloud computing platform includes a pool of computing resources, including hardware such as processors and storage devices. This pool of resources can be partitioned such that some of the resources can be allocated to execute one or more jobs for a user in exchange for payment by the user. As a result, the cloud computing platform can be used to execute many different jobs on behalf of multiple users.

A cloud computing platform allocates resources to execute one or more computing tasks on behalf of a user based on how the user pays for the platform's resources. Cloud platform operators offer different pricing options to meet diverse user computing requirements, such as reserved pricing, on-demand pricing, and spot pricing. In the reserved pricing option, a user makes a commitment to purchase platform resources over an extended period of time (e.g., multiple months, a year, multiple years, etc.) and receives discounted pricing on usage during that period. For example, the user may receive discounted hourly pricing on usage. In the on-demand pricing option, a user pays for platform resources without making any such long-term commitment and, for example, pays for the platform's resources on an hourly basis. In the spot pricing option, a user bids on platform resources and the user's job executes when the user's bid exceeds the current spot price of the platform resources. Users may use any one of the above pricing options or any suitable combination thereof.

Paying for resources using the on-demand pricing option provides platform resources, when available, whenever they are required by the user, but the user pays a premium for this convenience. On the other hand, paying for resources using the spot pricing option may allow the user to purchase resources at lower prices as compared to the on-demand option, but does not guarantee the availability of platform resources to the user. Indeed, when the spot price of the resources exceeds the user's bid price, the execution of the user's job may be suspended until the spot price falls below the bid price. Accordingly, using the spot pricing option presents a risk that a job may not complete by a deadline, if such a deadline exists.

SUMMARY

Cloud computing platform resources may be used to execute jobs on behalf of multiple users. Platform resources are allocated to jobs based on the way in which the users pay for jobs, but conventional techniques for determining how to pay for platform resources are heuristic. As a result, users may either overpay for platform resources or experience delays in job completion. Accordingly, techniques are disclosed for allocating platform resources by adaptively selecting a policy for each job to be executed by the cloud computing platform. The policy may specify the manner in which the user pays for platform resources, which are allocated to the job in accordance with the selected policy. The way in which policies are selected for a job may be adjusted based on the performance of policies on jobs that have been executed by the cloud computing platform. This adaptive resource allocation scheme provides a way to balance job requirements (e.g., when a job must be completed) with the cost of executing the job.

The adaptive resource allocation techniques described herein may also be applied in contexts other than cloud computing. As such, it is envisioned that these techniques may be applied in any setting where resources of any suitable type may be allocated to jobs. For example, an electric utility or any other suitable entity may utilize such techniques to allocate power grid resources to its customers by adaptively selecting a policy according to which power grid resources may be purchased.

Accordingly, in some embodiments, a method for adaptively allocating resources to a plurality of jobs is provided. The method comprises selecting a first policy from a plurality of policies for a first job in the plurality of jobs by using a policy selection mechanism, allocating at least one resource to the first job in accordance with the first policy, and in response to completion of the first job, updating the policy selection mechanism to obtain an updated policy selection mechanism by using at least one processor. Updating the policy selection mechanism comprises evaluating the performance of the first policy with respect to the first job by calculating a value of a metric of utility for the first policy based on conditions associated with execution of the first job and updating the policy selection mechanism based on the calculated value and a delay of execution of the first job.

In another aspect, a system for adaptively allocating cloud computing platform resources to a plurality of jobs is provided. The system comprises at least one processor configured to select a first policy from a plurality of policies for a first job in the plurality of jobs by using a policy selection mechanism. The at least one processor is further configured to allocate at least one computing resource to the first job in accordance with the first policy; and in response to completion of the first job, update the policy selection mechanism to obtain an updated policy selection mechanism by using at least one processor. Updating the policy selection mechanism comprises evaluating the performance of the first policy with respect to the first job by calculating a value for a metric of utility for the first policy based on conditions associated with execution of the first job and updating the policy selection mechanism based on the calculated value and a delay of execution of the first job.

In yet another aspect, at least one computer-readable storage medium is provided. The least one computer-readable storage medium stores processor-executable instructions that, when executed by at least one processor, cause the at least one processor to perform a method of determining a selection mechanism for a policy from a pool of policies. The method comprises executing each of a plurality of jobs in accordance with a policy in the pool of policies. Upon completion of execution of each of the plurality of jobs, the method further comprises determining conditions associated with execution of the job and a delay of execution of the job, computing a plurality of metrics of utility based on the determined conditions and the delay of execution of the job, each metric of utility being associated with a policy of the pool of policies, and updating a policy selection mechanism for a policy from the pool of policies based on the metric of utility computed for the policy and the delay of execution of the job.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that adaptive techniques for deciding how to purchase cloud computing platform resources may lead to improved allocation of platform resources to users' jobs and reduce the expense and delay associated with the execution of these jobs on the platform. The strategy specifying how to allocate cloud computing resources may be adapted based on factors including, but not limited to, the performance of the strategy with respect to already-executed jobs, history of the number and type of platform resources available, the history of spot prices associated with platform resources, and job requirements. The inventors have further recognized and appreciated that there may be a delay in obtaining information about the performance of a strategy for allocating platform resources for a job (e.g., such information may be available only after the job completes) and that a strategy for allocating platform resources may be adapted so that the way in which platform resources are purchased takes this delay into account.

The inventors have also recognized and appreciated that adaptive techniques for allocating cloud computing resources, as disclosed herein, may be employed by any of numerous parties. For example, a cloud computing platform operator may employ such adaptive techniques to decide how to allocate computing resources to jobs submitted by one or more users. Users may be charged for resources allocated to executing jobs on their behalf. Likewise, any users seeking to have jobs executed by the cloud computing platform may employ these techniques to determine how they would like computing resources on the cloud computing platform to be allocated to executing their jobs. A third party or parties may also employ these techniques to allocate computing resources by determining how to purchase computing resources on a cloud computing platform or platforms on behalf of one or more users.

The inventors have recognized that conventional approaches to deciding how to purchase cloud computing resources are heuristic and often result in undesirable allocation of platform resources—a user may overpay for platform resources or there may be unnecessary delays in the completion of the user's jobs. One such conventional approach involves using both the spot pricing and on-demand pricing options to purchase platform resources. In the approach, a user places a low bid on platform resources in an attempt to save money, but if platform resources are not allocated to the job within a pre-determined time interval (e.g., 20 minutes), the user pays for platform resources in accordance with on-demand pricing. Another conventional approach involves paying for platform resources using on-demand pricing when timely completion of the jobs is important (i.e., jobs with deadlines) and using spot pricing when inexpensive completion of the jobs is important. Neither of these approaches provides the user with any performance guarantees or allows the user to adjust the purchasing strategy based on the performance of the strategy with respect to previously-completed jobs. Moreover, such approaches limit the user to employing only a few of the many possible policies for purchasing platform resources.

The inventors have recognized and appreciated that adapting the strategy specifying how to purchase cloud computing platform resources based on performance of the strategy on other jobs and the delay in obtaining such performance information may overcome some of the above-mentioned drawbacks of conventional techniques for purchasing cloud computing resources. However, not every embodiment addresses every one of these drawbacks, and some embodiments may not address any of them. As such, it should be appreciated that the invention is not limited to addressing all or any of the above-discussed drawbacks of these conventional techniques for purchasing cloud computing resources.

Accordingly, in some embodiments, an adaptive strategy for allocating cloud computing platform resources may be employed. It should be appreciated that allocating platform resources to a job may comprise charging for or purchasing platform resources used to execute the job in accordance with one or more pricing options. The adaptive strategy may include selecting, from a set of policies, a policy according to which platform resources for a job may be allocated. The policy may be selected from the set of policies in any suitable way, but the way in which a policy is selected, in accordance with the strategy, from the set of policies may be updated as jobs executed by the cloud computing platform are completed.

The selection mechanism employed by the adaptive strategy to select a policy from the set of policies may be updated in any suitable way. In some embodiments, the update may be performed at least in part by calculating a value for a metric of utility for each policy in the set of policies with respect to any jobs that have been executed by the cloud computing platform. Such an update may also depend on conditions associated with the completed jobs including, but not limited to, a delay of execution of each such job, whether the job was completed on time and/or on budget, how many jobs arrived since that job was scheduled, how many platform resources were available during execution of the job, etc. Adapting the strategy for selecting policies in this manner may bias the strategy to select those policies that have been performing well (e.g., so that jobs executed in accordance with these policies were also executed in accordance with user's requirements such as finishing jobs by associated deadlines, within a specified budget, etc.). Additionally or alternatively, the update may be performed based on numerous other factors including, but not limited to, history of on-demand and spot prices associated with platform resources, the number and types of platform resources available, and job requirements.

In some embodiments, for example, the adaptive strategy may select a policy from a set of policies according to a distribution defined by weights corresponding to policies in the set of policies. The weights may be non-negative real numbers summing to one such that each weight defines a probability that a policy associated with the weight is selected by the adaptive strategy. The weight associated with a particular policy may be updated based at least in part on a metric of utility for that particular policy with respect to any completed jobs and any associated information. Accordingly, the greater the value of a metric of utility computed for a policy, the higher is the weight that is assigned to that policy. Thus, policies that have performed well, as indicated by the associated metric of utility, have a higher likelihood of being selected going forward, when policies need to be selected for other jobs for which cloud computing platform resources are needed.

A job may be any suitable computing task that may be executed by a cloud computing platform and may be specified in any suitable manner. In some embodiments, the job may be specified using one or more software applications along with any data or parameters required for their execution on the cloud computing platform. Any suitable parameters may be used. For example, the parameters may include an arrival time parameter that indicates the arrival time of a job to which cloud computing platform resources are to be allocated and a deadline time parameter indicating a time by which the job is to be completed. The deadline time may be also specified indirectly via a duration period starting from the arrival time and indicating that the job is to be completed before the end of the duration period.

As another example, the parameters specifying a job may include one or more job size parameters indicative of the amount of platform resources that may be required to execute the job. For instance, a job size parameter may indicate the number of CPU hours required to execute the job. A job size parameter also may indicate an amount of memory required to execute the job. As yet another example, the parameters specifying a job may include a parallelism constraint parameter indicating an upper bound on the number of computing instances (e.g., CPU's, virtual machines, etc.) that may be simultaneously used to execute to the job. As yet another example, the parameters specifying a job may include a cost budget for the execution of the job.

It should be recognized that when computing platform resources are allocated to a job, multiple computing instances may be allocated to the job in accordance with a policy. As such, any of the previously-described pricing options may be used with respect to each computing instance. Thus, in some embodiments, a combination of pricing options may be used to purchase computing resources for a single job. For example, if multiple computing instances may be allocated to a job, some of those instances may be purchased using spot pricing, while other instances may be purchased using on-demand or even reserved pricing. It should also be recognized that different bid prices may be associated with each instance purchased using spot pricing such that if multiple instances allocated to a job are purchased using the spot pricing option, these instances may be purchased using different bids. It should be appreciated that, in some scenarios, a user may be charged for a computing instance based on the market spot price of the instance rather than the price bid by the user. Though, in other scenarios, a user may be charged for the computing instance based on the price bid by the user.

The completion of a job on behalf of a user may be associated with a value to a user. The value may depend on conditions associated with the job's execution. In some instances, the value may depend on the amount of resources and/or execution time that it took for the job to complete. The value associated with the job's completion may be a non-increasing function of time, a monotonically non-increasing function of time, a decreasing function of time, etc. For example, the value associated with a job completed after its deadline time may be equal to 0. As another example, the value associated with a job may have any suitable constant value until the job's deadline after which the value is equal to zero.

In addition to a value, the completion of a job may be associated with a utility that reflects the value of the job's completion and the cost of completing it. Accordingly, a metric of utility may be used to compute the utility of the job based on the value of completing the job and the cost of executing the job in accordance with a policy. The policy may be any suitable policy and may be a policy with respect to which platform resources were allocated to the job or a policy with respect to which platform resources could have been allocated to the job, but were not. Moreover, because a metric of utility may be computed for a completed job with respect to any policy (not merely the policy used to allocate resources for the completed job), a value of a metric of utility may be calculated for each of multiple policies with respect to the completed job. The calculated values may be compared to provide a basis for characterizing which policy or policies would have performed best on the completed job. In turn, this information may be used to update the way in which policies are selected for subsequent jobs.

In some embodiments, a value for the metric of utility of a job may be calculated based on conditions associated with execution of the job. Such conditions may include, but are not limited to, how long the job took to execute, whether the job completed by the deadline, the value associated with completion of the job, cost of executing the job. For instance, a value for the metric of utility may be calculated as the difference between the value associated with the completion of the job and the cost of executing the job to the user in accordance with a policy. The cost may be any suitable type of cost such as a monetary cost, but may be any other suitable type of cost as aspects of the present invention are not limited in this respect. The cost of executing a job may be calculated in any suitable way and, for example, may be calculated as the sum of the costs associated with purchasing platform resources as specified by the policy. For example, the cost may be calculated as the sum of costs associated with any spot instances used to execute the job (e.g., number of spot instances multiplied by the bid price over time) and the cost associated with any on-demand instances used to execute the job (e.g., number of on-demand instances multiplied by the on-demand price). Though, it should be recognized that a job's value and/or utility may be computed in any other suitable way (e.g., using any of numerous value and utility functions as known in the art) as aspects of the present invention are not limited in this respect.

It should be recognized that allocating platform resources in accordance with the adaptive techniques disclosed herein may allow for the utility associated with the jobs performed by the cloud computing platform to be optimized. The adaptive techniques may allow for resources to be allocated to a sequence of jobs such that the difference between the cumulative performance of the sequence of policies selected for these jobs (by using the disclosed techniques) and the cumulative performance of the best policy selected in hindsight (e.g., after learning what the spot prices were during a particular time interval) is minimized. This difference is sometimes termed "regret," since there would be no regret associated with a selection of a policy that, in hindsight, was the best possible policy to use. In some embodiments, the average regret (averaged over the number of jobs to which resources were allocated) may be minimized.

As previously mentioned, adaptively allocating cloud computing platform resources includes selecting a policy for a particular job such that computing platform resources may be allocated to the job in accordance with the policy. A policy may specify how to allocate platform resources to a particular job by specifying how a user may pay for the platform resources used to execute that job. The policy may depend on any of numerous factors including, but not limited to, the specification of the job, remaining work to be done for the job, the total cost already incurred in processing the job, the history of spot prices associated with the cloud computing platform, and the number and type of available resources in the cloud computing platform.

Adaptively allocating cloud computing platform resources includes selecting a policy from among a set of policies parameterized by one or more parameters using a selection mechanism that is updated based on performance of policies in the set of policies. For example, in some embodiments, a policy may be selected from a set of so-called "fixed-bid" policies, which provide for allocating computing resources to a job by allocating computing instances purchased using both spot pricing and on-demand pricing. A fixed-bid policy is parameterized by a fixed bid value b and a proportion σ of on-demand computing instances to be used when allocating computing instances to the job, where σ is between 0 and 1, inclusive, and b is any positive real number. For instance, if $c_j$ computing instances are to be allocated to job j, then $\sigma*c_j$ on-demand computing instances may be purchased at the on-demand price and $(1-\sigma)*c_j$ spot instances may be purchased at fixed bid value b. Accordingly, a family of fixed-bid policies may be created by varying these parameters.

In some embodiments, allocating computing instances in accordance with a particular fixed-bid policy may comprise adjusting the proportion σ of on-demand computing instances. For example, a fixed-bid policy may specify setting σ closer to 1 or even equal to 1, so that computing instances are purchased only with respect to on-demand pricing. This may occur if it is determined that more on-demand resources may be necessary to ensure that a job completes by the specified deadline. Furthermore, in some embodiments, a fixed-bid policy may not allocate any resources to a job, when it is determined that the cost of the job has exceeded its value or if the job cannot be finished on time.

Another example of a set of policies from which a policy may be selected is a set of so-called "variable-bid" policies, which are similar to fixed-bid policies with one difference being that the bid value b may be chosen adaptively. The bid value may be chosen in any suitable way and, for example, may be chosen based on past spot prices associated with the cloud computing platform. As such, the bid value may be set as weighted average of past spot prices. Older spot prices may be discounted in any suitable way and, for example, may be exponentially discounted using a weight parameter by using autoregressive moving average (ARMA)-based time series models. The bid may also be adjusted by a safety parameter to handle small price variations. Accordingly, a family of variable-bid policies may be created by varying these parameters.

Figure 4A:
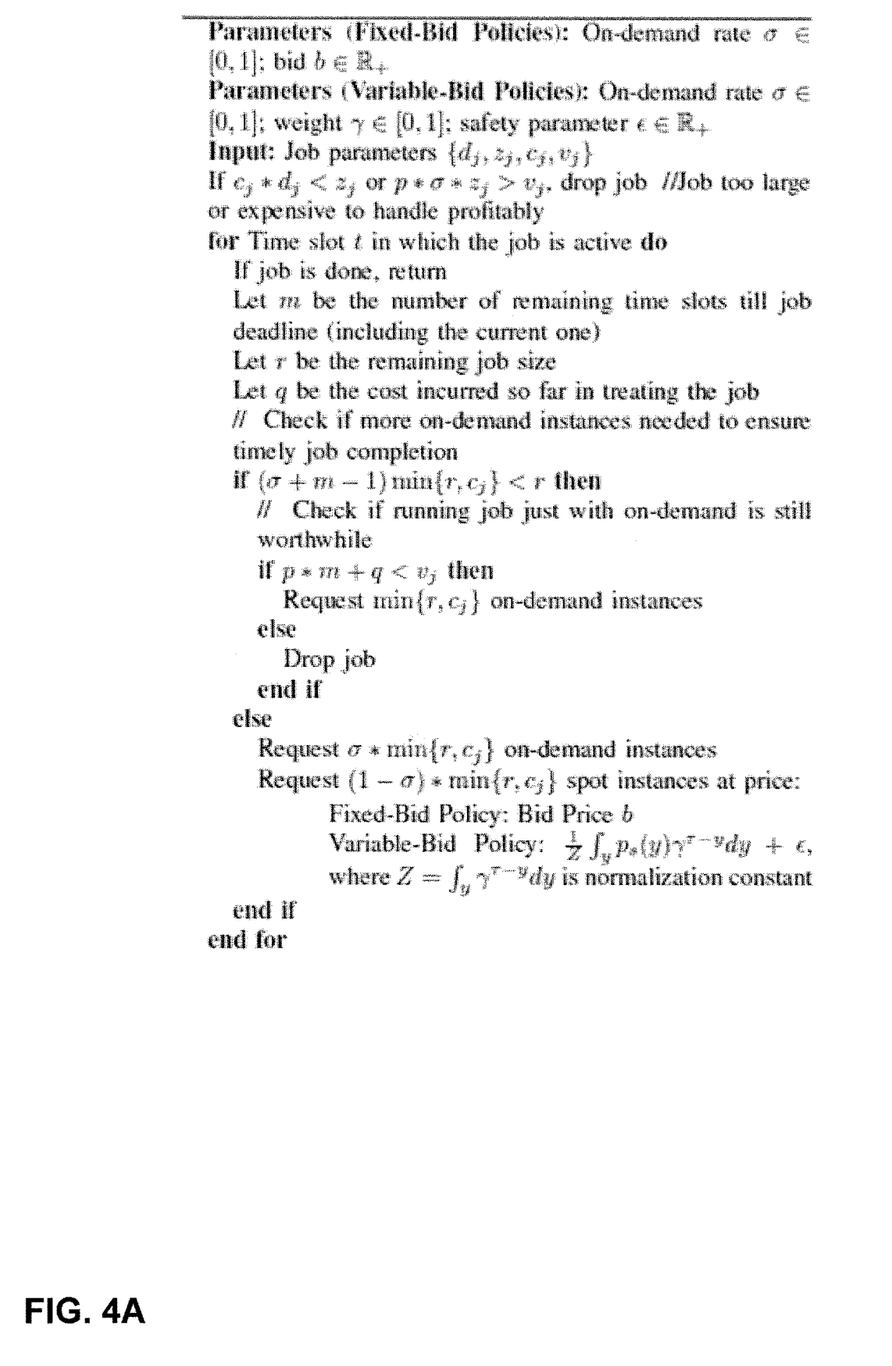
FIG. 4A illustrates computer-program pseudo-code for two exemplary policies for allocating resources, in accordance with some embodiments of the present disclosure.

Examples of fixed-bid and variable-bid policies are further illustrated in FIG. 4A, which shows example computer program pseudo-code that may be used to guide implement the implementation of these types of policies. In FIG. 4A, the variables $d_j$, $z_j$, $c_j$, and $v_j$ correspond to the duration period parameter for the j'th job, the amount of work remaining to be done for the j'th job, the number of computing instances to be allocated to the j'th job, and the value associated with completing the j'th job, respectively.

It should be appreciated that the above-described policies are only two examples of the types of policies that may be used to allocate cloud computing platform resources to jobs. As such, any of numerous other types of policies may be used to allocate cloud computing resources to jobs, as aspects of the present invention are not limited in this respect.

It should be appreciated that the various aspects and concepts of the present invention described herein may be implemented in any of numerous ways, and are not limited to any particular implementation technique. Examples of specific implementations are described below for illustrative purposes only, but the aspects of the invention described herein are not limited to these illustrative implementations.

Figure 1:
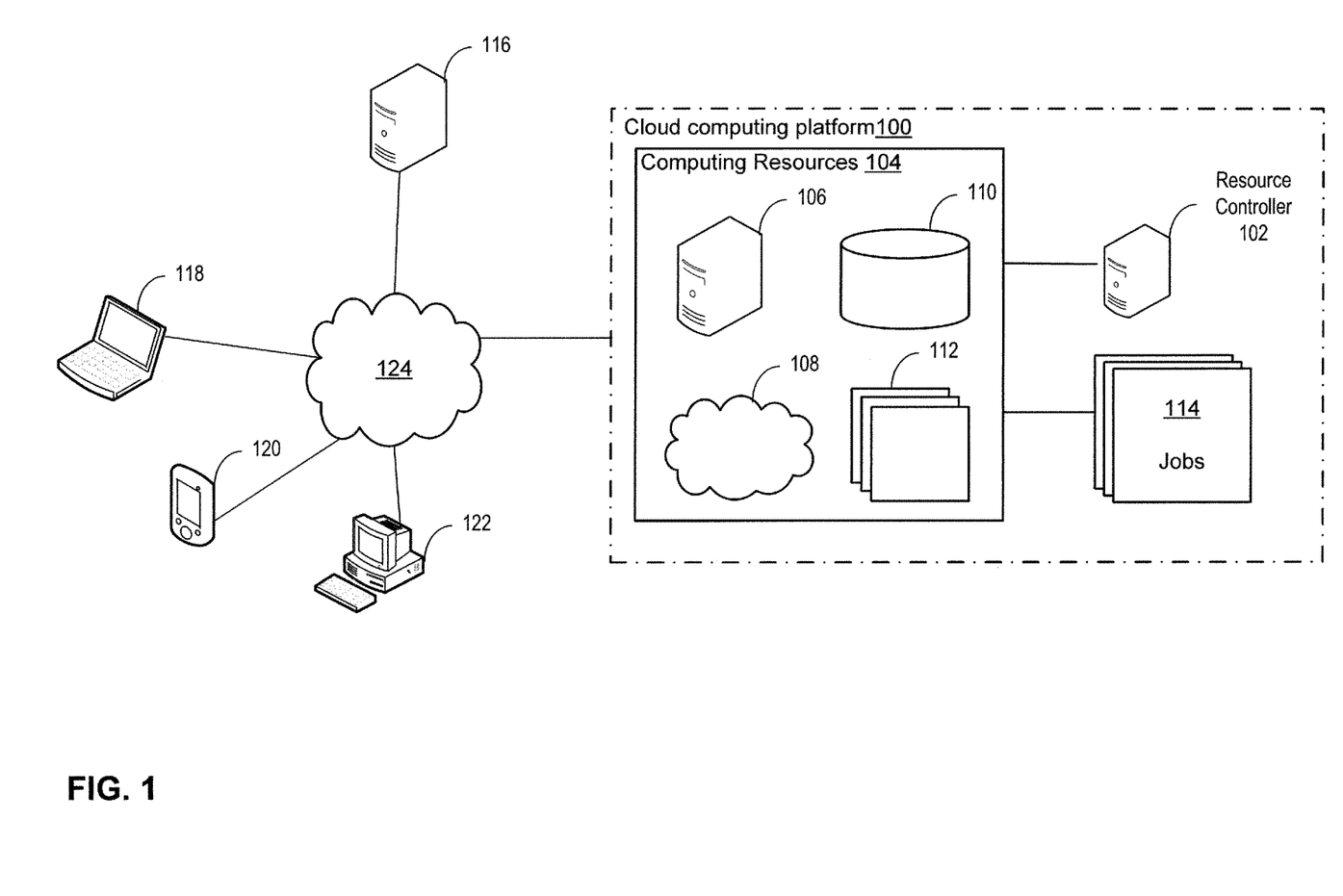
FIG. 1 shows an exemplary computing environment for allocating resources, in accordance with some embodiments of the present disclosure.

FIG. 1 illustrates a computing environment comprising a cloud computing platform 100. Cloud computing platform 100 may be any suitable arrangement of computing resources, operated by a cloud operator, for execution of computing tasks on behalf of users. A cloud operator may be any suitable entity or collection of entities responsible for cloud computing platform 100. Similarly, a user may be any suitable entity or collection of entities seeking to have one or more computing tasks to be executed by the cloud computing platform 100. For example, either or both of the cloud operator and the user may be a human, a collection of humans, a commercial or non-commercial organization, a collection of commercial or non-commercial organizations, or any other suitable entity.

As illustrated in FIG. 1, cloud computing platform 100 includes various elements, including resource controller 102 and platform resources 104. Resource controller 102 acts on behalf of the cloud operator to manage allocation of the resources 104 for execution of one or more jobs 114. Jobs 114 are executed by allocated resources of the cloud computing platform 100. Platform resources 104 may be allocated to jobs 114 and may include any suitable types of resources, including hardware resources, like processing resources 106, networking resources 108, information storage resources 110, and software resources like software 112. Processing resources 106 may include hardware processors (e.g., microprocessors). Networking resources 108 may include any suitable networking hardware, including input/output hardware like network interface cards (NICs) and transmission hardware like routers, hubs, switches, etc. Networking resources 108 may include resources for use by jobs 114 as well as networking resources connecting other computing resources via any suitable local, wide-area, and/or enterprise communication network. Information storage resources 110 may include any suitable devices or media on which information may be encoded. Software resources 112 may include copies of software that may be used by one or more jobs 114 and/or by the cloud computing platform 100 while executing jobs 114. While not illustrated in FIG. 1, resources 104 may also include any suitable utility resources associated with other resources of the cloud computing platform 100. For example, the resources 104 may further include utility resources such as energy resources like electricity. As another example, the resources 104 may further include supporting resources like a waiter or air supply for cooling other resources (e.g., a cooling system for a processing resource 106). Any suitable resources may be included as resources 104 of the cloud computing platform 100.

Cloud computing platform resources 104 may be allocated by resource controller 102 in any suitable manner. In some embodiments, platform resources 104 may be allocated in logical groups of resources called computing instances. A computing instance may comprise physical and/or virtual resources. A computing instance may comprise any suitable amount of processing resources, information storage resources, networking resources, and/or any other suitable resources. Allocating computing instances in this manner may be implemented in any suitable way as known in the art and, for example, may be implemented by using virtual machines, virtualization techniques, and/or distributed/parallel processing techniques for allocating physical resources.

Resource controller 102 may use any suitable technique to allocate platform resources 104 to executing one or more jobs on behalf of a user. In some embodiments, resource controller 102 may allocate resources to a job in accordance with a policy selected for allocating resources to that job. Allocating resources to a job in accordance with a policy may comprise charging a user for one or more computing instances for the job in accordance with one or more pricing options such as on-demand pricing and spot pricing as specified by the policy. Resource controller 102 may use any suitable policy for allocating resources to a job including, but not limited to, any of the previously described types of policies such as fixed-bid policies and variable-bid policies. The policy may be selected in any suitable way, and the mechanism by which resource controller 102 selects policies from a pool of policies may be adaptive. As such, the mechanism may be updated based on a metric of utility computed for each policy in the set of policies with respect to one or more previously-completed jobs. Techniques that may be used by the resource controller 102 to allocate platform resources to jobs are described in greater detail below with reference to FIGS. 3 and 4B.

In some embodiments, resource controller 102 may receive one or more requests to allocate resources to one or more jobs on behalf of one or more users. Such requests may be generated by one or more computing devices external to cloud computing platform 100. For example, a request to allocate resources to a job on behalf of a user may be generated by computing device 112 (or any other device associated with the user), which may be configured to perform any of the adaptive techniques for allocating cloud computing resources described herein.

The request may be in any suitable format and may comprise any suitable information including, but not limited to, information associated with a job or jobs, and any associated information for executing the job(s) such as data, execution parameters, and configuration files. The request may specify a policy in accordance with which resources may be allocated to jobs. For example, the request may specify the manner in which a user may be charged computing instances used for executing one or more jobs on the user's behalf. Though, it should be recognized that, in some embodiments, resource controller 102 may not receive any requests from sources external to cloud computing platform 100 and may generate any such allocation requests on its own, as the case may be when resource controller 102 is configured to perform any of the adaptive techniques for allocating computing resources described herein.

The cloud computing platform 100, or any components of the cloud computing platform 100, may exchange information about a job with a computing device 116 associated with a user on whose behalf one or more jobs may be executed by the cloud computing platform. Any suitable type or types of information may be exchanged with the computing device 116, as embodiments are not limited in this respect. For example, information about the job(s), about performance of the job(s), about execution of the job(s), and/or about allocation of resources to the job(s) may be exchanged between the cloud computing platform 100 and computing device 116. In addition, in some cases, a software application may be exchanged between the cloud computing platform 100 and the computing device 116, including instructions of a job or jobs application and/or any information used by the jobs.

Jobs 114 may include jobs of any suitable type or types. For example, jobs 114 may include one or more batch jobs. A batch job may perform predefined processing, in some instances, based on user-specified parameters (e.g., a specified period of time, a specified budget, a specified policy, etc.). Another type of job is a user-interactive software application. User-interactive applications are those applications that interact with a user and include functionality to perform user operations requested by the users. This may be any suitable type of functionality or user operations, as embodiments are not limited in this respect. Users of the software applications 110 may operate user computing devices, such as user computing devices 118, 120, 122 to exchange information with the cloud computing platform 100 and with jobs 114 executing on the cloud computing platform 100. The exchanged information may be, for example, requests for information or requests to allocate resources to a job sent by the user computing devices 118, 120, and 122, and responses to the requests sent by the cloud computing platform 100. The user computing devices 118, 120, and 122 may exchange information with the cloud computing platform 100 via a communication network 124, which may be any suitable one or more wired and/or wireless networks, including the Internet.

When the cloud computing platform 100 is executing jobs 114, some of the resources 104 of the cloud computing platform 100 are allocated to each job of the jobs 114. When resources are allocated to a job, the resources may execute instructions associated with the job, store information managed by the job, or perform any other functionality related to executing a job. For example, as part of executing the job, resource controller 102 may receive a request for information from a user computing device 118, process the request, retrieve the requested information, process the requested information, and respond to the user computing device 118 with the requested information.

It should be appreciated that the computing system illustrated in FIG. 1 is only illustrative and that many variations are possible. For example, in some embodiments some functionality of the resource controller 102 may be performed external to cloud computing platform 100. For example, one or more external computing devices, external to cloud computing platform 100, may be configured to identify policies in accordance with which resources are to be allocated to jobs. The external computing devices may communicate this information to cloud computing platform in any suitable way, as aspects of the present invention are not limited in this respect.

Figure 2:
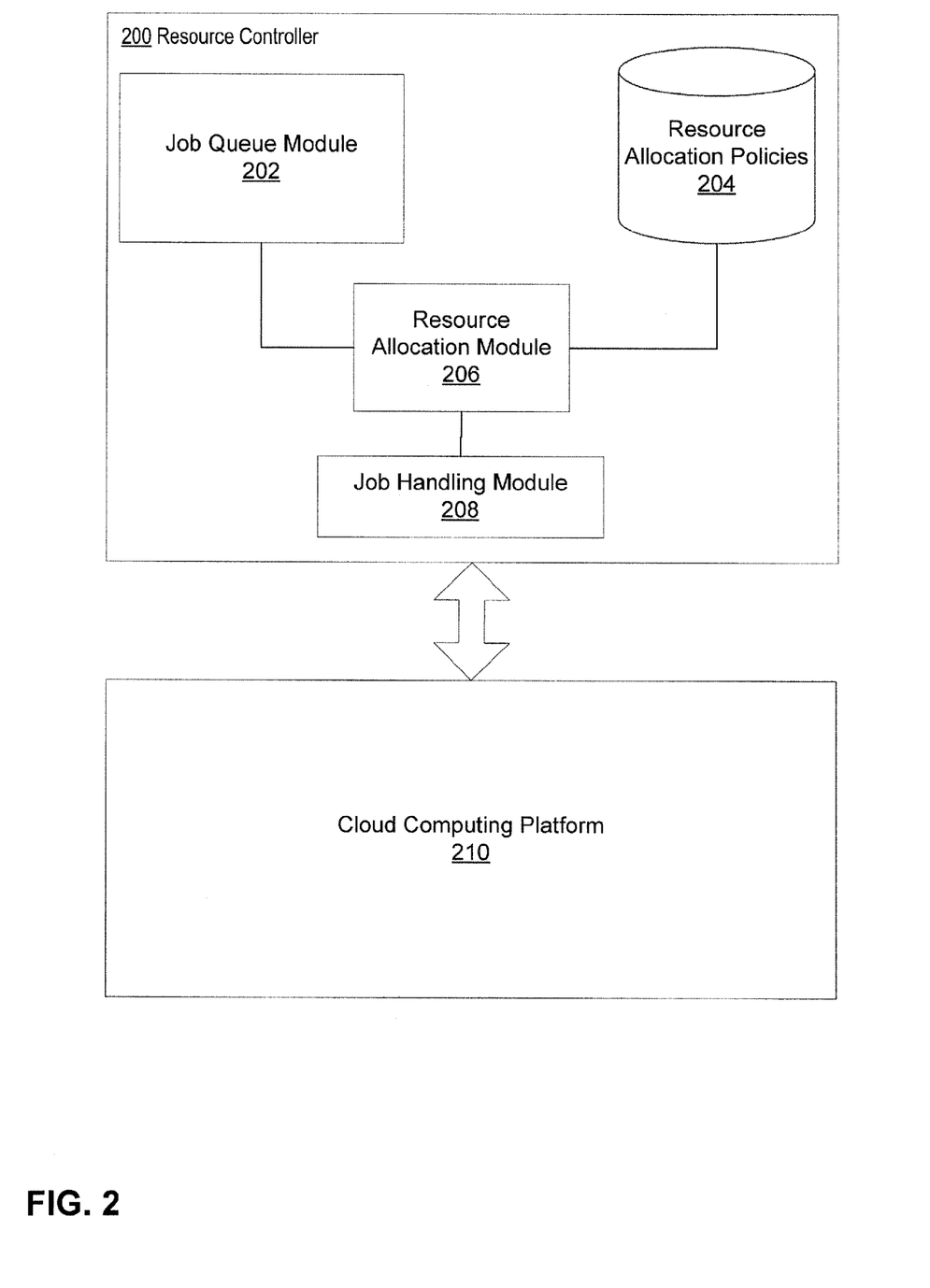
FIG. 2 is a block diagram of software components within a computing environment for allocating resources, in accordance with some embodiments of the present disclosure.

One example of a computing system in which some functionality of the resource controller is performed outside a cloud computing platform is illustrated in FIG. 2, which shows resource controller 200 as being external to cloud computing platform 210. Resource controller 200 may perform some or all of the functionality of resource controller 102 previously described with reference to cloud computing platform 100. Cloud computing platform 210 may be any suitable type of cloud computing platform that may be configured to allocate platform resources to execute jobs on behalf of one or more users.

Resource controller 200 may be implemented in any suitable way and may be implemented using any suitable combination of hardware and software components. FIG. 2 shows a block diagram of some of the software components of illustrative resource controller 200 that may be used to implemented techniques described herein for adaptive allocation of cloud computing platform resources to jobs. Software components may be stored as software executable instructions and configuration parameters and may be stored on any suitable tangible computer-readable storage medium or media including any of the computer-readable storage media described below.

In the illustrated embodiments, resource controller 200 comprises various software modules including job queue module 202, resource allocation policies pool 204, resource allocation module 206, and job handling module 208. Though, it should be recognized that this is only an illustration and that a resource controller may comprise any other software modules in addition to or instead of the above-mentioned software modules. It should also be recognized that although, in the illustrated embodiment, the software modules are shown as being executed by hardware external to cloud computing platform 210, in other embodiments one or more of the above-mentioned module may be executed by cloud computing platform 210 as aspects of the present invention are not limited in this respect.

Job queue module 202 may be configured to store information associated with each job to be executed by cloud computing platform 210. Job queue module 202 may store such information in any suitable way and, for example, may store the information associated with the jobs in the order that the information was provided to the job queue module (i.e., based on the job's arrival). As such, job queue module 202 may be configured to specify an order in which jobs may be handled by resource controller 200. To this end, job queue module 202 may be configured to provide information associated with the next job to be handled by resource controller 200 or to indicate that there are no jobs to be handled.

Job queue module 202 may be configured to store any suitable information associated with each job to be executed by cloud computing platform 210. For example, job queue module 202 may store processor-executable instructions or software applications required to execute a job and any of the previously-described parameters associated with the job (e.g., arrival time parameter, deadline time parameter, job size parameter, parallelism constraint parameter, etc.). Additionally or alternatively, job queue module 202 may store a reference or a pointer to a location where such information may be found. Though, it should be recognized that information associated with each job may be stored in any suitable way and is not limited to being stored by using a queue data structure.

Resource allocation policies pool 204 may be configured to store processor-executable instructions and/or parameters used to specify policies for allocating cloud computing platform resources to jobs. Resource allocation policies pool 204 may be configured to store any suitable number of policies of any suitable type of policies including, but not limited to, any of the previously-described policies such as fixed-bid policies and variable-bid policies. For example, resource allocation policies module may store any suitable number of fixed-bid policies, each stored policy being associated with a different set of parameters (e.g., each stored policy has a unique fixed-bid value b and/or a unique proportion value σ). Similarly, resource allocation policies module may store any suitable number of variable-bid policies, each stored policy being associated with a different set of parameters (e.g., each stored policy has a unique weight parameter, a unique safety parameter, and/or a unique way of calculating a bid price based on historical spot prices).

In some embodiments, resource allocation policies pool 204 may be configured to allow one or more users or administrators to specify one or more policies. This may be done in any suitable way, as the invention is not limited in this respect. For example, this may be done using a graphical user interface for specifying policies or by providing a language in which policies may be specified.

Resource allocation module 206 may be configured to select a policy from resource allocation policies pool 204, for each job to be executed by cloud computing platform 210, such that platform resources are allocated to each job in accordance with the policy selected for that job. Resource allocation module 206 may be configured to select a policy using any suitable policy selection mechanism. For example, in some embodiments, policies in policies pool 204 may be associated with weights and resource allocation module 206 may be configured to select a policy for a job at random according to a distribution defined by the weights. Though, resource allocation module 206 may be configured to select a policy using any other suitable way.

After selecting a policy for a job, resource allocation module 206 provides the job and the selected policy to job handling module 208 that communicates this information to cloud computing platform 210 such that cloud computing platform 210 may allocate platform resources to the job in accordance with the policy selected for the job.

Resource allocation module 206 also may be configured to update the policy selection mechanism it uses to select policies for jobs. Resource allocation module 206 may update the policy selection mechanism in any suitable way and, for instance, may update the mechanism based on the performance of the policy. For example, if resource allocation module 206 is configured to select policies from policies pool 204 using weights associated with policies, module 206 may be configured to adjust the weights based on the performance of the policies. The weight associated with a particular policy may be adjusted based on a metric of utility of that policy as computed with respect to any previously-completed jobs as described in more detail with reference to FIG. 3.

It should be appreciated that information about the performance of a policy may not be available until after execution of one or more jobs, in accordance with the policy, is completed. Accordingly, there may be a delay associated with receiving information about the performance of a policy. This implies that there may be a delay associated with when resource allocation module 206 may update the way in which it selects policies based on the performance of the policy or other policies.

Thus, in some embodiments, resource allocation module 206 may update the way in which it selects policies from policies pool 204 based at least in part on a measure of the delay incurred between choosing a policy for a job and evaluating the performance of the policy for that job. Such a delay may be termed the delay of execution of a job. Such a delay measure may be specified in any suitable way and, for example, may be specified as an upper bound on the number of jobs that arrive during the execution of any particular job on the cloud computing platform.

Resource allocation module 206 may be configured to receive any information from cloud computing platform 210 that may be used in updating the way in which resource allocation module 206 selects policies. Such information may include historical spot prices associated with the computing platform, history of the number and type of platform resources available, any conditions associated with execution of completed jobs (e.g., how long a job took to complete, how much it cost, how many times the job was interrupted, how many and what type of platform resources were allocated to the job, etc.), and/or any other information used to evaluate the performance of a policy.

It should be recognized that resource controller 200 may use information obtained from cloud computing platform 210 for any other suitable purpose. For example, resource controller 200 may use historical spot prices to compute a bid price for a variable-bid policy, since the bid price in such a policy may depend on the history of spot prices associated with cloud computing platform resources.

Figure 3:
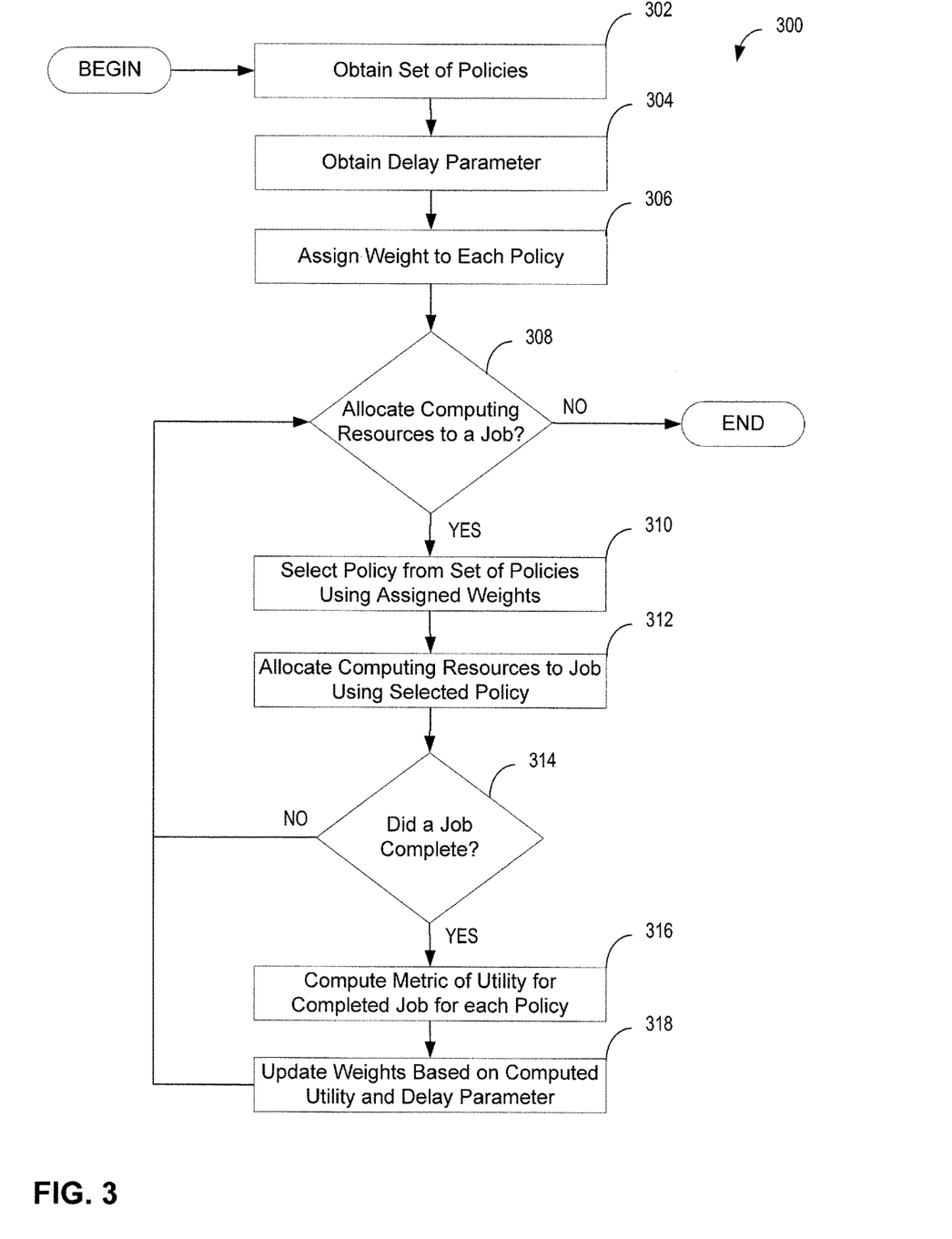
FIG. 3 is a flow chart of an illustrative process for allocating resources, in accordance with some embodiments of the present disclosure.

Resource controllers 102 and 200 may implement any suitable technique or techniques for allocating cloud computing platform resources to jobs in order to execute the jobs. One such technique is illustrated in FIG. 3, which is a flow chart of illustrative process 300 for adaptively allocating cloud computing platform resources to jobs. It should be appreciated that acts of process 300 may be performed by a cloud computing platform (e.g., by using resource controller 102), by hardware external to the cloud computing platform (e.g., by using resource controller 200), or any suitable combination thereof.

Process 300 begins in act 302, where a set of policies is obtained. The set of policies may include any suitable number of policies of any suitable type. The set of policies may include any of the previously-described types of policies including fixed-bid and variable-bid policies. For example, the set of policies may include at least two, at least five, at least ten, and/or at least one hundred policies. Below, we denote the number of policies in the set by a positive integer n.

The set of policies may be obtained in any suitable way. A policy may be specified by a user or be obtained, automatically, by being selected from a pool of policies such as, for example, policies pool 204 described with reference to FIG. 2.

Next process 300 proceeds to act 304, where a value of a delay parameter may be obtained. The value of the delay parameter may be indicative of the delay incurred between the time a policy was selected for a job and the time the performance of the policy for that job may be evaluated. In some embodiments, the value of the delay parameter may be an upper bound on the number of jobs that may arrive (e.g., be added to a job queue such as job queue 202) during the execution of any other job. In some embodiments, the value of the delay parameter may be an upper bound on the number of jobs to which cloud computing platform resources may be allocated during execution of the first job. The value of the delay parameter may be set manually (e.g., by a user, an administrator, etc.) or automatically. The value may be set based on a pre-determined value or empirically, based on measure of how many jobs have arrived during the execution of any previously-executed jobs.

Next process 300 proceeds to act 306, where a weight is assigned to each policy in the set of policies obtained in act 302. Any suitable weight may be assigned to a policy. The weight may be non-negative and may be any real number between 0 and 1, inclusive. In some instances, weights may define a distribution and, as such, the weights may be normalized such that the weights may sum to a predetermined number (e.g., the weights may sum to one). For example, if there are n policies, each policy may be assigned the weight 1/n so that a policy could be selected from the set of policies uniformly at random. Though, it should be appreciated that any suitable weights may be assigned to policies in the set of policies.

Next, process 300 proceeds to decision block 308, where it is determined whether cloud computing platform resources should be allocated to a job. This determination may be made in any suitable way, as aspects of the present invention are not limited in this respect. For example, it may be determined that platform resources should be allocated to a job if there are any jobs pending for execution (e.g., in job queue 202) or if it is known that a job is expected to arrive within a predetermined period of time. If it is determined that platform resources need not be allocated to any job, process 300 completes.

On the other hand, if it is determined in decision block 308 that computing resources are to be allocated to a job, process 300 proceeds to act 310, where a policy to be used for allocating computing resources to the job is selected based on the weights assigned to each policy in the set of policies. For example, the policy may be selected in accordance with a distribution defined by the weights such that a weight associated with a policy is indicative of the probability with which the policy is selected. As another example, the policy may be selected based on the type of policy and the weights associated with each policy.

Regardless of the way in which a policy is selected in act 310, process 300 proceeds to act 312, where cloud computing platform resources may be allocated to the job in accordance with the selected policy. In some embodiments, allocating resources to a job in accordance with the selected policy may comprise charging a user for one or more computing instances for executing the job in accordance with the pricing options specified by the policy. For example, if a policy specifies that a particular number of on-demand computing instances be purchased at the on-demand price, allocating resources to the job in accordance with the policy comprises attempting to purchase the particular number of on-demand computing instances at the on-demand price. As another example, if a policy specifies that a particular number of spot instances be purchased at a specified bid price, allocating resources to the job in accordance with the policy comprises attempting to purchase the particular number of bid instances at the bid price.

In some embodiments, allocating resources to a job in accordance with the selected policy may comprise requesting that resources are allocated to the job in accordance with the policy, which may be the case when process 300 is executed by a computing device or devices (e.g., computing device 112, resource controller 200) external to the cloud computing platform.

Next process 300 proceeds to decision block 314, where it is determined whether a job being executed by the cloud computing platform has completed. This job may be any job being executed by the cloud computing platform and, for example, may be a job to which platform resources were previously allocated in act 312. The determination of whether a job has completed may be made in any suitable way, as this is not a limitation of aspects of the present invention.

If it is determined, in decision block 314, that no job has completed, process 300 loops back to decision block 308 via the "NO" branch. Otherwise, process 300 proceeds to act 316, via the "YES" branch, where a metric of utility may be computed for one or more policies with respect to the completed job. In some instances, a metric of utility may be computed for each policy in the set of policies obtained in act 302. As such, up to n different utilities may be calculated, one for each of the n policies in the set of policies obtained in act 302.

Any suitable metric of utility may be used to calculate a utility for a policy with respect to a completed job, including any of the previously-discussed metrics of utility. The metric of utility may be calculated based with one or more conditions associated with the execution of the completed job including, but not limited to, any of the previously described conditions. As a specific non-limiting example, a metric of utility calculated by subtracting the cost of executing a job according to a policy from the value of completing the job may be used. In turn, the value of completing the job may depend on whether or not the job completed by the deadline associated with a job or within some pre-specified time period. In addition, any suitable information for calculating a metric of utility for a policy with respect to the completed job may be used. For example, the history of spot and on-demand prices, history of the number and types of available platform resources, and any of numerous other types of information may be used.

In some embodiments, the same metric of utility may be calculated for each policy. Though, in other embodiments, different metrics of utility may be used to calculate utility for different policies. In this case, let $f_j(\pi)$ denote the measure of utility calculated for policy $\pi$ and job $j$ by using metric of utility $f_j(\ )$.

Regardless of the metric of utility employed and the manner in which it is calculated, process 300 next proceeds to act 318, where the way in which policies are selected from a set of policies (e.g., in act 310) is updated. To this end, weights associated with policies in the set of policies (obtained in act 302) may be adjusted.

The weights associated with the policies may be adjusted in any suitable way. For example, the weights may be adjusted by using one or more multiplicative updates. In some embodiments, the weights may be adjusted based on the utilities calculated in act 316 by using one or more metrics of utility. Additionally, the weights may be adjusted based on the delay parameter specified in act 304. Accordingly, the delay between when platform resources are allocated to a job according to a policy and when a metric of utility for that policy is computed may be taken into account. It should be appreciated that the metric(s) of utility may depend on any of numerous factors including, but not limited to, history of spot prices associated with platform resources, history of the number and type of platform resources available, and job requirements.

One specific example of how a weight $w_{j,\pi}$ associated with policy $\pi$ may be updated after the completion of job $j$ to produce an updated weight $w_{j=1,\pi}$ is given by the following formula:

$$w_{j+1,\pi} = \frac{w_{j,\pi}\exp(\eta_j f_j(\pi))}{\sum_{j=1}^{n} w_{j,\pi}\exp(\eta_j f_j(\pi))},$$

where the constant $\eta_j$ depends on the delay parameter d obtained in act 304. For example, $\eta_j$ may be defined according to:

$$\eta_j = \sqrt{2\log(n)/d(j-d)}.$$

Though, it should be recognized that any of numerous other update rules may be used.

After the weights are updated in accordance with any of the above-described rules, the weights may be normalized such that the normalized weights specify a distribution according to which policies may be selected.

After the weights are updated in act 318, process 300 loops back to decision block 308, where process acts 308-318 may be repeated when there are more jobs to which platform resources should be allocated, and if there are no more jobs to which platform resources should be allocated, process 300 completes.

It should be appreciated that the regret associated with process 300 may be quantified for a particular weight update rule. The average regret for a particular policy $\pi$, J jobs, and delay d, is given by:

$$\frac{1}{J}\sum_{j=1}^{J} f_j(\pi) - \frac{1}{J}\sum_{j=1}^{J} f_j(\pi_{j-d}).$$

If each utility function $f_j(\ )$ is bounded on [0,1], and the above-described weight update is used, then for any $\delta$ in (0,1), we have that the average regret is bounded, with probability 1−δ, as follows:

$$\max_{\pi} \frac{1}{J}\sum_{j=1}^{J} f_j(\pi) - \frac{1}{J}\sum_{j=1}^{J} f_j(\pi_{j-d}) \leq 8\sqrt{\frac{d\log(n/\delta)}{J}} + \frac{8\log(n)}{J}.$$

Figure 4B:
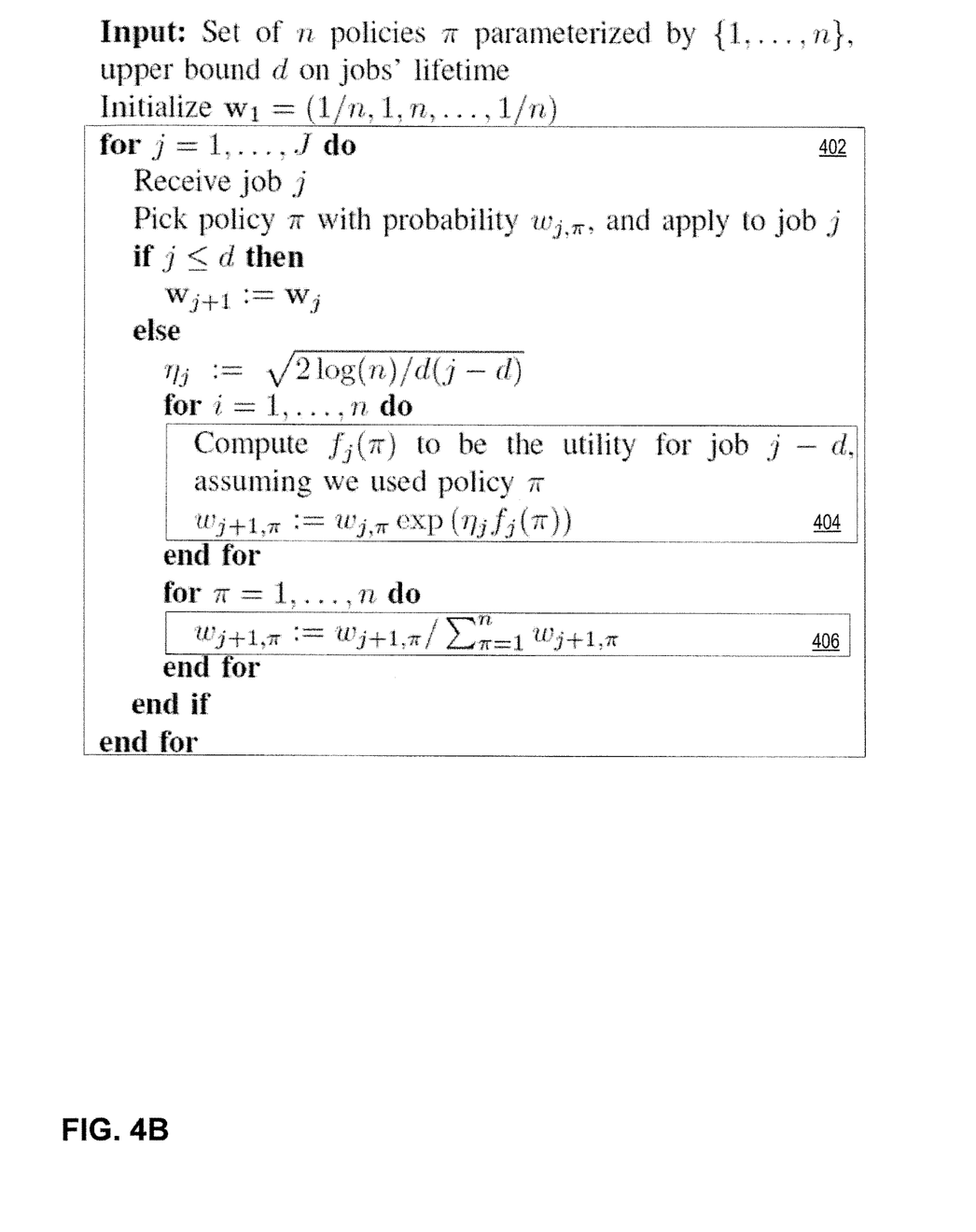
FIG. 4B illustrates computer-program pseudo-code for another illustrative process for allocating resources, in accordance with some embodiments of the present disclosure.

Another example of a process for allocating cloud computing platform resources to jobs is illustrated in FIG. 4B, which shows example computer program pseudo-code that may be used to guide the implementation of a process for adaptive resource allocation, in accordance with some embodiments.

The illustrated pseudo-code shows set of iterations 402 comprising an iteration for each job to be processed. In each iteration, one of n policies may be selected for the job based on the weights associated with policies, for example, as described with respect to act 310 of process 300. If the j'th job has completed (such that j>d), the parameter $\eta_j$ may be computed in accordance with the above specified formula.

Next, set of iterations 404, comprising an iteration for each policy, may be performed. For each policy, a metric of utility may be calculated and the weight of that policy may be updated based on the calculated metric of utility and the parameter $\eta_j$, which in turn depends on the delay parameter d. Finally, the updated weights may be normalized by using set of iterations 406.

Figure 5:
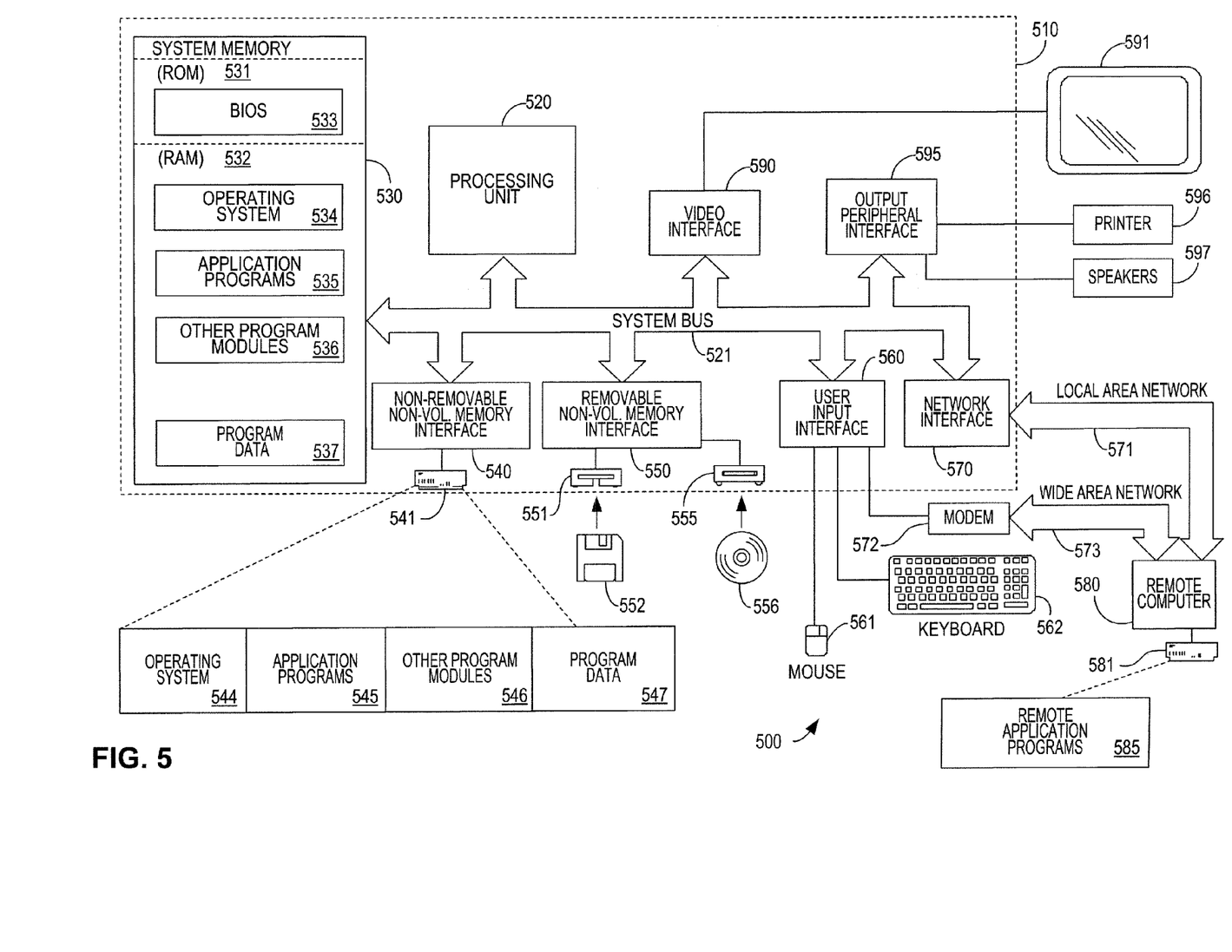
FIG. 5 is a block diagram generally illustrating an example of a computer system that may be used in implementing aspects of the present disclosure.

FIG. 5 illustrates an example of a suitable computing system environment 500 on which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through an non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through a output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. Indeed, techniques disclosed herein may be applied in contexts other than to allocating cloud computing platform resources. The described techniques for adaptive resource allocation may be applied to allocate any suitable type of resource and, for example, may be applied to allocating energy resources such as electricity on one or more power grids or in any other suitable setting.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which examples have been provided (e.g., process 300 describe with reference to FIG. 3 and the processes illustrated by the computer pseudo-code shown in FIG. 4B). The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for adaptively allocating resources to a plurality of jobs, the method comprising:
    selecting a first policy from a plurality of policies for a first job in the plurality of jobs by using a policy selection mechanism, wherein each policy specifies how to allocate one or more resources by specifying pricing options for payment of the one or more resources used to execute one or more of the plurality of jobs;
    allocating at least one resource to the first job in accordance with the first policy; and
    in response to completion of the first job, updating the policy selection mechanism to obtain an updated policy selection mechanism by using at least one processor, wherein updating the policy selection mechanism comprises evaluating the performance of the first policy with respect to the first job by calculating a value of a metric of utility for the first policy based on conditions associated with execution of the first job and updating the policy selection mechanism based on the calculated value and a delay of execution of the first job, wherein the conditions associated with execution of the first job comprise both a value associated with completion of the first job and a cost of executing the first job.

2. The method of claim 1, wherein the method further comprises:
    selecting a second policy from the plurality of policies for a second job in the plurality of jobs by using the updated selection mechanism, wherein the second job is different from the first job; and
    allocating at least one resource to the second job based on the second policy.

3. The method of claim 1, wherein each policy in the plurality of policies is associated with a weight, and wherein selecting the first policy by using the policy selection mechanism comprises:
    selecting the first policy according to a distribution defined by weights; and
    corresponding to policies in the plurality of policies.

4. The method of claim 3, wherein updating the policy selection mechanism further comprises updating the distribution defined by the weights corresponding to policies by calculating an updated weight for each policy in the plurality of policies, wherein calculating an updated weight for a particular policy comprises:
    calculating a value for a metric of utility with respect to the particular policy based on conditions associated with execution of the first job; and
    calculating the updated value based on the calculated value and the delay of execution of the first job.

5. The method of claim 1, wherein the delay of execution of the first job is indicative of a time delay between selecting the first policy for the first job and evaluating the performance of the first policy with respect to the first job.

6. The method of claim 1, wherein the first policy specifies an amount to bid on the at least one resource based on a history of prices for the at least one resource, and wherein allocating the at least one resource in accordance with the first policy comprises charging the amount for the at least one resource when a bid for the amount is accepted.

7. The method of claim 1, wherein the at least one resource comprises a first resource and a second resource, wherein the first policy specifies purchasing the first resource using on-demand pricing and purchasing the second resource using spot pricing, and wherein:
    allocating the at least one resource in accordance with the first policy comprises charging an on-demand price for the first resource.

8. The method of claim 1, wherein the at least one resource is a computing resource of a cloud computing environment.

9. A system for allocating cloud computing platform resources, the system comprising:
    at least one processor configured to:
        select a first policy from a plurality of policies for a first job in the plurality of jobs by using a policy selection mechanism, wherein each policy specifies how to allocate one or more resources by specifying pricing options for payment of the one or more resources used to execute one or more of the plurality of jobs;
        allocate at least one computing resource to the first job in accordance with the first policy; and in response to completion of the first job, update the policy selection mechanism to obtain an updated policy selection mechanism by using at least one processor,
  wherein updating the policy selection mechanism comprises evaluating the performance of the first policy with respect to the first job by calculating a value for a metric of utility for the first policy based on conditions associated with execution of the first job and updating the policy selection mechanism based on the calculated value and a delay of execution of the first job, wherein the conditions associated with execution of the first job comprise both a value associated with completion of the first job and a cost of executing the first job.

10. The system of claim 9, wherein the at least one processor is further configured to:
  select a second policy from the plurality of policies for a second job in the plurality of jobs by using the updated policy selection mechanism, wherein the second job is different from the first job; and
  allocate at least one computing resource to the second job based on the second policy.

11. The system of claim 10, wherein the at least one processor is configured to update the policy selection mechanism by updating the distribution defined by the weights corresponding to policies by calculating an updated weight for each policy in the plurality of policies, wherein the at least one processor is configured to calculate an updated weight for a particular policy by:
  calculating a value for a metric of utility with respect to the particular policy based on conditions associated with execution of the first job; and
  calculating the updated value based on the calculated value and the delay of execution of the first job.

12. The system of claim 11, wherein the at least one processor is configured to select the second policy according to a distribution defined by the updated weights.

13. The system of claim 9, wherein the delay of execution of the first job is an upper bound on the number of jobs arriving during execution of the first job.

14. The system of claim 9, wherein the first job is specified by an arrival time parameter, a deadline time parameter, a job size parameter, and a parallelism constraint parameter and a utility valuation function of a value obtained by finishing the job as a function of due date.

15. At least one tangible computer-readable storage medium storing processor-executable instructions that, when executed by at least one processor, cause the at least one processor to perform a method of determining a selection mechanism for a policy from a pool of policies, the method comprising:
  executing each of a plurality of jobs in accordance with a policy in the pool of policies, wherein each policy specifies how to allocate one or more resources by specifying pricing options for payment of the one or more resources used to execute each of the plurality of jobs;
  upon completion of execution of each of the plurality of jobs:
  determining conditions associated with execution of the job and a delay of execution of the job, wherein the conditions associated with execution of the job comprise both a value associated with completion of the job and a cost of executing the job;
  computing a plurality of metrics of utility based on the determined conditions and the delay of execution of the job, each metric of utility being associated with a policy of the pool of policies; and
  updating a policy selection mechanism for a policy from the pool of policies based on the metric of utility computed for the policy and the delay of execution of the job.

16. The at least one tangible computer-readable storage medium of claim 15, wherein executing each of the plurality of jobs comprises:
  selecting a first policy by using the policy selection mechanism; and
  executing a first job in the plurality of jobs in accordance with the first policy.

17. The at least one tangible computer-readable storage medium of claim 16, wherein the first policy specifies renting at least one computing resource in accordance with at least one of on-demand pricing, spot pricing, or reserved pricing.

18. The at least one tangible computer-readable storage medium of claim 15, wherein determining the conditions associated with execution of the job comprises determining whether the job execution completed by a deadline associated with the job and a cost associated with executing the job.

19. The at least one tangible computer-readable storage medium of claim 15, wherein executing a job in the plurality of jobs comprises allocating at least one cloud computing resource to the job.

20. The at least one tangible computer-readable storage medium of claim 15, wherein the pool of policies comprises at least one fixed-bid policy and at least one variable-bid policy.

* * * * *